United States Patent
Sato et al.

(10) Patent No.: US 7,522,636 B2
(45) Date of Patent: Apr. 21, 2009

(54) SYSTEM FOR CONTROLLING A PLURALITY OF EQUIPMENTS

(75) Inventors: Hirokazu Sato, Tokyo (JP); Hideaki Hashimoto, Kanagawa-ken (JP); Junji Ooaki, Kanagawa-ken (JP); Fumio Ozaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 691 days.

(21) Appl. No.: 10/912,125

(22) Filed: Aug. 6, 2004

(65) Prior Publication Data

US 2005/0123000 A1    Jun. 9, 2005

(30) Foreign Application Priority Data

Aug. 8, 2003  (JP)  ............... P2003-206783
Aug. 4, 2004  (JP)  ............... P2004-228610

(51) Int. Cl.
  H04J 1/00    (2006.01)
(52) U.S. Cl. ............... 370/480; 370/485; 370/535
(58) Field of Classification Search ............ 370/480, 370/485, 490, 495, 535, 537, 542
   See application file for complete search history.

(56) References Cited

U.S. PATENT DOCUMENTS

| 4,156,112 A | | 5/1979 | Moreland | |
|---|---|---|---|---|
| RE32,327 E | * | 1/1987 | Biba et al. | 267/124 |
| 5,272,700 A | * | 12/1993 | Hansen et al. | 370/480 |
| 5,608,728 A | * | 3/1997 | Ulm et al. | 370/488 |
| 5,953,348 A | * | 9/1999 | Barn | 370/480 |
| 6,588,342 B2 | | 7/2003 | Griggs, III et al. | |

FOREIGN PATENT DOCUMENTS

| JP | 60-256250 | 12/1985 |
|---|---|---|
| JP | 63-109696 | 5/1988 |
| JP | 63-132398 | 6/1988 |
| JP | 2000-244444 | 9/2000 |
| JP | 2000-307545 | 11/2000 |

OTHER PUBLICATIONS

Masao Nakagawa, "Distributed Real-Time Wireless Technology", Information Processing Society of Japan Magazine, Jan. 2003, vol. 44, No. 1, pp. 14-18.
Journal of the Robotics Society of Japan, vol. 20, No. 1, pp. 89-97, 2002, Zhang et al., "Mathematical Model for Binocular Movements Mechanism and Construction of Eye Axes Control System".
Electronic Technology, vol. 44, No. 4., pp. 14-18, "A Characteristic of Ultrasonic Motor and its Driving Control Technology", K. Kataoka.

* cited by examiner

Primary Examiner—Brenda Pham
(74) Attorney, Agent, or Firm—Oblon, Spivak, McClelland, Maier & Neustadt, P.C.

(57) ABSTRACT

A main control apparatus is connected to a single signal line. A plurality of equipments is respectively connected to a multipoint line. Each multipoint line diverges from the single signal line. The main control apparatus sends a control signal to each equipment through the single signal line using a frequency band. Each equipment receives the control signal from the main control apparatus through the multipoint line using the frequency band. Each equipment is assigned a unique frequency from within the frequency band.

18 Claims, 13 Drawing Sheets

SYSTEM FOR CONTROLLING A PLURALITY OF EQUIPMENTS

CROSS-REFERENCE TO RELATED APPLICATIONS

This application is based upon and claims the benefit of priority from prior Japanese Patent Applications P2004-228610, filed Aug. 4, 2004 and P2003-206783, filed on Aug. 8, 2003; the entire contents of which are incorporated herein by reference.

FIELD OF THE INVENTION

The present invention relates to a system for controlling a plurality of equipments each connected to a multipoint line through a single signal line by a main control apparatus.

BACKGROUND OF THE INVENTION

In general, a real time performance system must immediately modify or change operation based on change in the surrounding environment. Furthermore, in a hard real time performance system, immediacy is more required than in a system in which the real time performance is required.

In this case, in a control system for mechatoronics equipment such as an industrial equipment or a robot, in order to maintain performance and safety of the mechatoronics equipment, the hard real time performance is required. Briefly, in the control system of the mechatoronics equipment, a permissible time from occurrence of a predetermined event to processing of the event is very short.

Accordingly, in the control system of the mechatoronics equipment, in order to maintain the hard real time performance, a main control apparatus and a plurality of equipments each controlled by the main control apparatus are connected by a leased signal line set to each equipment. Concretely, a control signal including a broadcast signal or an interrupt signal is transmitted through the leased signal line of each equipment. For example, this technique is disclosed in the following two references.

(1) Journal of the Robotics Society of Japan, Vol. 20, No. 1, pp. 89~97, Zhang et al. "Mathematical Model for Binocular Movements Mechanism and Construction of Eye Axes Control System"

(2) Electronics technology, Vol. 44, No. 4, pp. 14~18, "A characteristic of ultrasonic motor and its driving•control technology", Kenichi Kataoka However, in recent control systems for mechatoronics equipment, the control system is comprised of a large number of equipments because a high level function and a high performance are required. On the other hand, in the control system of the mechatoronics equipment, a main control apparatus and a plurality of equipments each controlled by the main control apparatus are connected by a leased signal line of each equipment. Accordingly, in the control system of mechatoronics equipment, a large number of signal lines are necessary in proportion to a number of equipments connected to the main control apparatus. As a result, the large number of signal lines is in the way to realize a miniaturization, a low price, and a portability of the mechatoronics equipment.

SUMMARY OF THE INVENTION

The present invention is directed to a control system for reducing the number of signal lines connecting a main control apparatus with each of a plurality of equipments.

According to an aspect of the present invention, there is provided a control system, comprising: a main control apparatus configured to connect to a single signal line and to send a control signal to the single signal line using a frequency band; and a plurality of equipments respectively configured to connect to a multipoint line, each multipoint line being diverged from the single signal line. Each equipment receives the control signal from the multipoint line using the frequency band. Each equipment is assigned a unique frequency or frequency sub-band from within the frequency band.

According to another aspect of the present invention, there is also provided a control system, comprising: a main control apparatus configured to connect to a single signal line; and a plurality of equipments respectively configured to connect to a multipoint line, each multipoint line being diverged from the single signal line, and to send a control signal to the multipoint line using a frequency band. Said main control apparatus receives the control signal of each equipment from the single signal line using the frequency band. Each equipment is assigned a unique frequency or frequency sub-band from within the frequency band.

DETAILED DESCRIPTION OF THE EMBODIMENTS

Hereinafter, various embodiments of the present invention will be explained by referring to the drawings.

Figure 1:
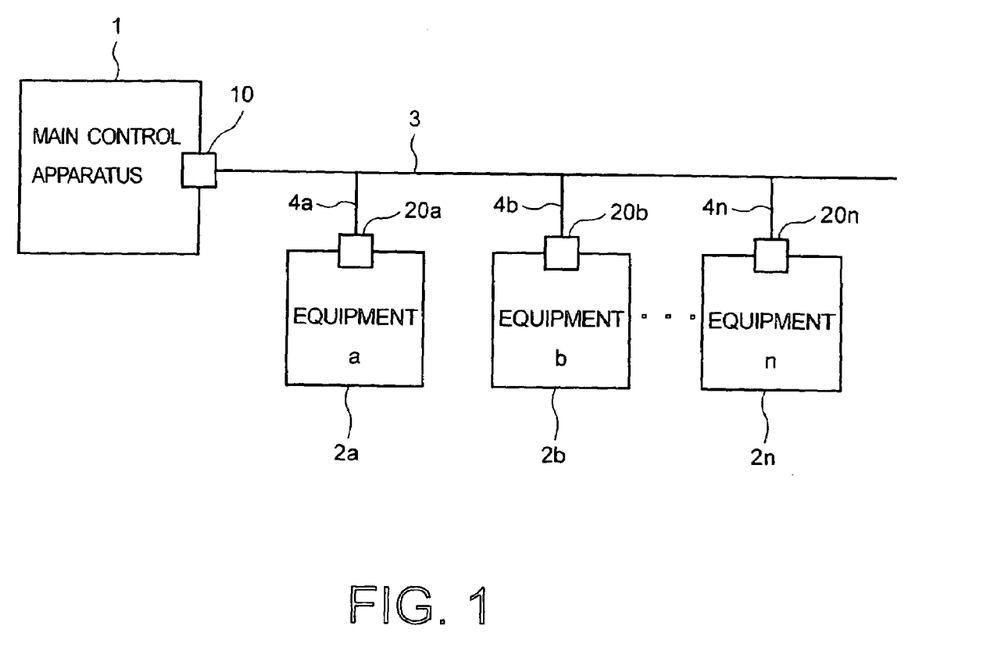
FIG. 1 is a block diagram of the control system according to one embodiment of the present invention.

FIG. 1 is a block diagram of the control system according to one embodiment of the present invention. As shown in FIG. 1, in the control system of the present embodiment, a main control apparatus 1 is connected to a single signal line 3 through an interface circuit 10, and equipments 2a~2n are respectively connected with a multipoint line 4a~4n each diverged from the single signal line 3. In this case, a relationship between the single signal line 3 and the multipoint line 4a~4n represents a component that the multipoint line 4a~4n are diverged from the single signal line 3. The multipoint line may be diverged by bus type distribution. Furthermore, as a kind of line, the single signal line and the multipoint line may be distributed by an ordinary signal line, an optical fiber, or a coaxial cable.

The main control apparatus 1 controls the equipments 2a~2n. Hereinafter, component of the interface circuit 10 is explained.

Figure 2:
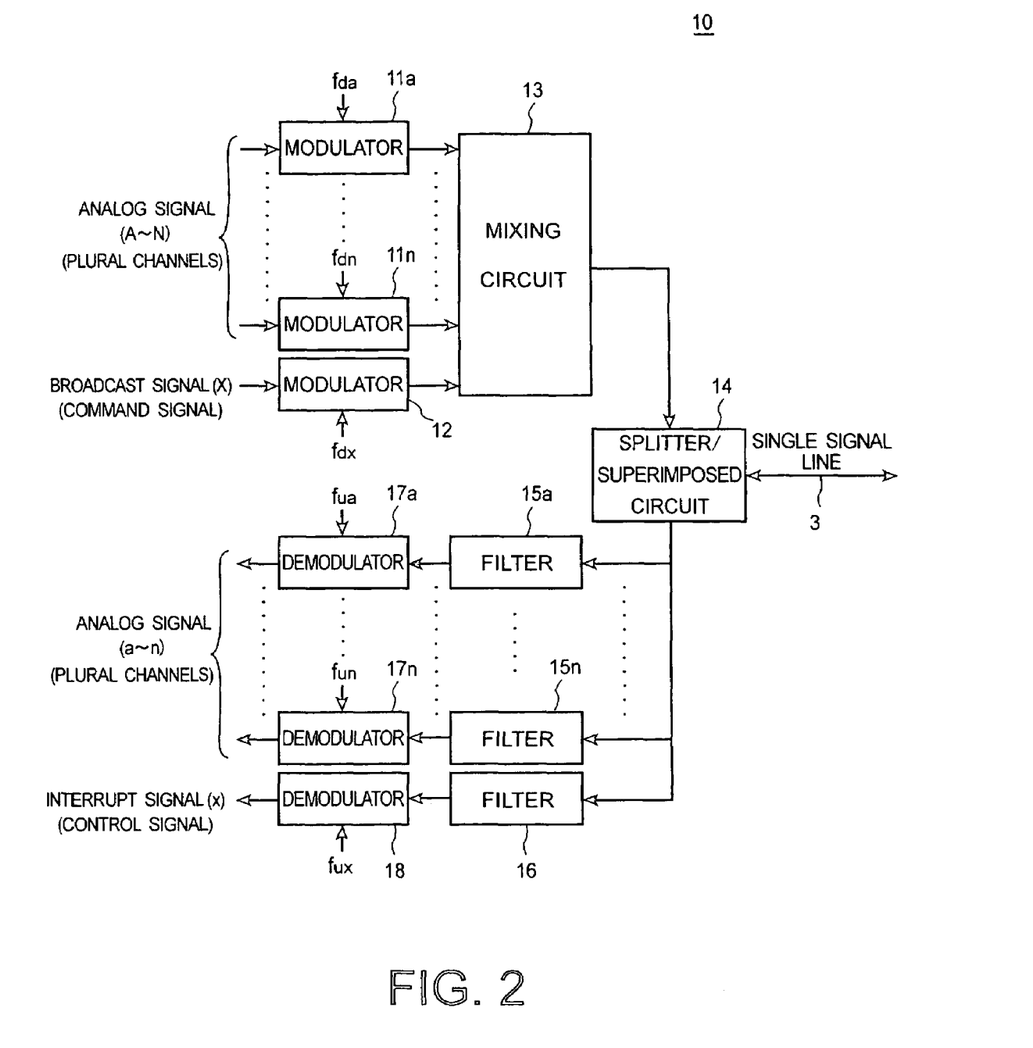
FIG. 2 is a block diagram of an interface circuit 10 in the control system of FIG. 1 according to the present embodiment.

FIG. 2 is a block diagram of the interface circuit 10 according to the present embodiment. As shown in FIG. 2, the interface circuit 10 includes modulators 11a~11n, a modulator 12, a mixing circuit 13, a splitter/superimposed circuit 14, filters 15a~15n, a filter 16, demodulators 17a~17n, and a demodulator 18.

The modulators 11a~11n respectively modulate an analog signal (A~N) to output from the main control apparatus 1 to the equipments 2a~2n. In this case, the analog signal (A) is an analog signal to output to the equipment 2a, and the analog signal (B) is an analog signal to output to the equipment 2b.

The modulator 12 modulates a broadcast signal (X) from the main control apparatus 1 to the equipments 2a~2n.

The mixing circuit 13 mixes the analog signal (A~N) modulated by the modulators 11a~11n with the broadcast signal (X) modulated by the modulator 12.

The splitter/superimposed circuit 14 respectively superimposes the analog signal (A~N) and the broadcast signal (X) mixed by the mixing circuit 13 on a predetermined frequency band ($f_{da}$~$f_{dn}$, $f_{dx}$). Each frequency band divides into a plurality of frequency sub-bands or frequencies. As should be apparent to one of ordinary skill, a frequency may indicate a frequency band and vice versa depending on the application and equipment. In this case, the frequency ($f_{da}$) is assigned to the equipment 2a, and the frequency ($f_{db}$) is assigned to the equipment 2b.

Furthermore, the splitter/superimposed circuit 14 separates analog signals (a~n) and an interrupt signal (x) to output from the equipments 2a~2n to the main control apparatus 12. The analog signals (a~n) and the interrupt signal (x) were already superimposed by a splitter/superimposed circuit 24a in FIG. 3 as explained below.

The filters 15a~15n respectively pass a signal sent using a predetermined frequency band. Concretely, the filters 15a~15n respectively extract an analog signal sent using a frequency band ($f_{ua}$~$f_{un}$) assigned to each analog signal from the analog signals (a~n) separated by the splitter/superimposed circuit 14. For example, the filter 15a extracts the analog signal (a) to output from the equipment 2a to the main control apparatus 1. The analog signal (a) was sent using a frequency ($f_{ua}$) assigned to the equipment 2a.

The filter 16 passes a signal sent using a predetermined frequency band. Concretely, the filter 16 extracts the interrupt signal (x) sent using a frequency ($f_{ux}$) from the interrupt signal (x) separated by the splitter/superimposed circuit 14. If the splitter/superimposed circuit 14 can separate the interrupt signal (x) only, the filter 16 may be omitted.

The demodulators 17a~17n respectively demodulate the analog signals (a~n) extracted by the filters 15a~15n. The demodulator 18 demodulates the interrupt signal (x) extracted by the filter 16.

Briefly, the interface circuit 10 is a sending means for sending a control signal (analog signal (A)) for a first equipment 2a to the single signal line 3 using the frequency ($f_{da}$) assigned to the first equipment 2a, and for sending a control signal (analog signal (B)) for a first equipment 2b to the single signal line 3 using the frequency ($f_{db}$) assigned to the first equipment 2b.

Furthermore, the interface circuit 10 is a receiving means for receiving a control signal (analog signal (a)) sent using the frequency ($f_{ua}$) assigned to the first equipment 2a and a control signal (analog signal (b)) sent using the frequency ($f_{ub}$) assigned to the second equipment 2b from the single signal line 3.

Figure 3:
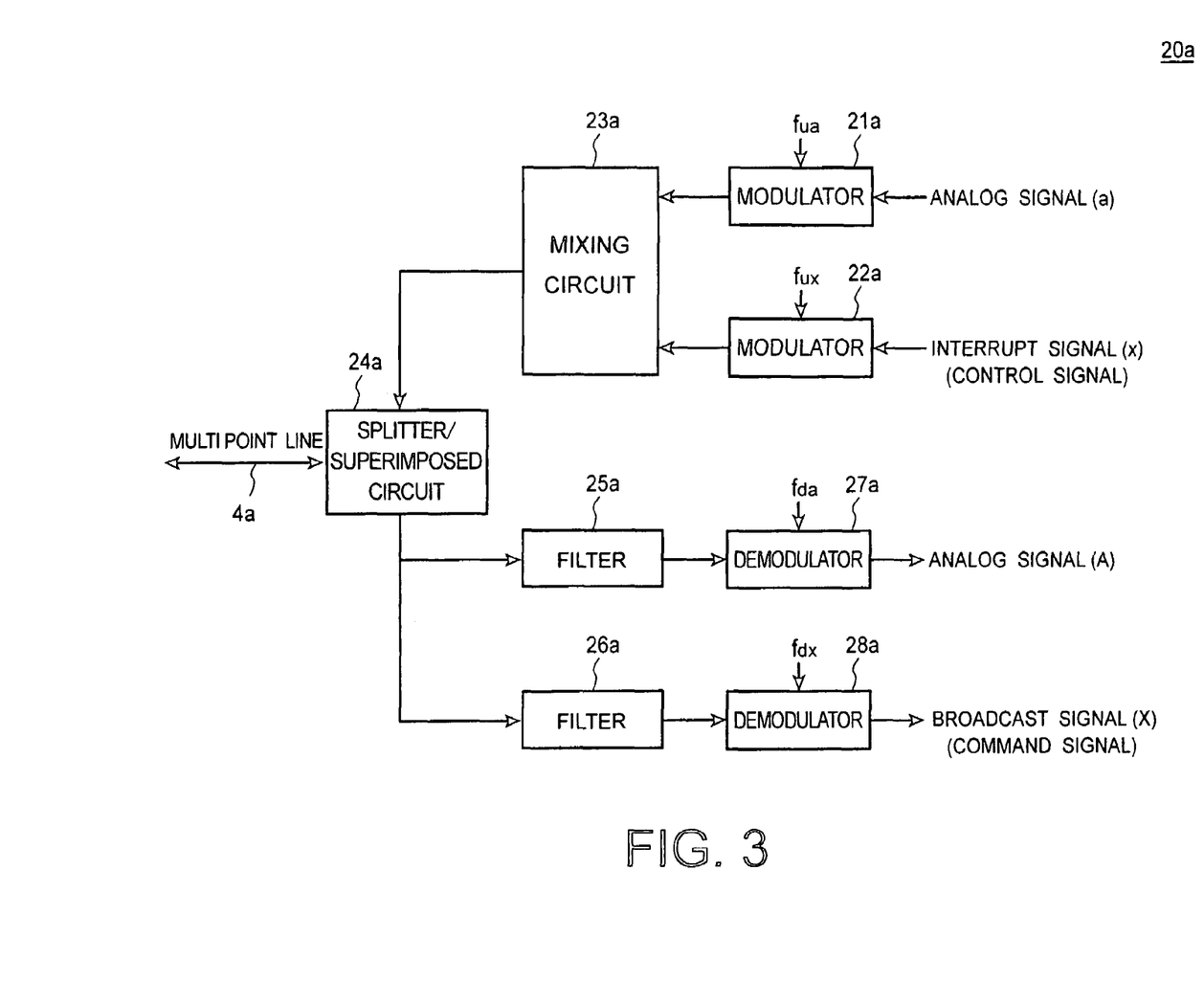
FIG. 3 is a block diagram of an interface circuit 20a in the control system of FIG. 1 according to the present embodiment.

FIG. 3 is a block diagram of the interface circuit 20a according to the present embodiment. The interface circuits 20a~20n have the same components. Accordingly, the interface circuit 20a is only explained as an example.

As shown in FIG. 3, the interface circuit 20a includes a modulator 21a, a modulator 22a, a mixing circuit 23a, a splitter/superimposed circuit 24a, a filter 25a, a filter 26a, a demodulator 27a, and a demodulator 28a.

The modulator 21a modulates an analog signal (a) to output from the equipment 2a to the main control apparatus 1. The modulator 22a modulates an interrupt signal (x) to output from the equipment 2a to the main control apparatus 1.

The mixing circuit 23a mixes the analog signal (a) modulated by the modulator 21a with the interrupt signal (x) modulated by the modulator 22a.

The splitter/superimposed circuit 24a respectively superimposes the analog signal (a) and the interrupt signal (x) mixed by the mixing circuit 23a on a predetermined frequency band ($f_{ua}$, $f_{ux}$). Furthermore, the splitter/superimposed circuit 24a separates the analog signals (A~N) and the broadcast signal (X) each output from the main control apparatus 1 to the equipment 2a.

The filter 25a passes a signal sent using a predetermined frequency band. Concretely, the filter 25a extracts the analog signal (A) sent using the frequency ($f_{da}$) from the analog signals (A~N) separated by the splitter/superimposed circuit 24a.

The filter 26a passes a signal sent using a predetermined frequency band. Concretely, the filter 26a extracts the broadcast signal (X) sent using the frequency ($f_{dx}$) from the broadcast signal (X) separated by the splitter/superimposed circuit 24a. If the splitter/superimposed circuit 24a can separate the broadcast signal (X) only, the filter 26a may be omitted.

The demodulator 27a demodulates the analog signal (A) extracted by the filter 25a. The demodulator 28a demodulates the broadcast signal (X) extracted by the filter 26a.

Briefly, in the present embodiment, the interface circuit 20a is a first receiving means for receiving a control signal (analog signal (A)) sent using a frequency ($f_{da}$) assigned to a first equipment 2a from the multipoint line 4a. Furthermore, the interface circuit 20a is a first sending means for sending a control signal (analog signal (a)) sent using a frequency ($f_{ua}$) assigned to the first equipment 2a to the multipoint line 4a.

In the same way, the interface circuit 20b is a second receiving means for receiving a control signal (analog signal (B)) sent using a frequency ($f_{db}$) assigned to a first equipment 2b from the multipoint line 4b. Furthermore, the interface circuit 20b is a second sending means for sending a control signal (analog signal (b)) sent using a frequency ($f_{ub}$) assigned to the second equipment 2b to the multipoint line 4b.

Figure 4:
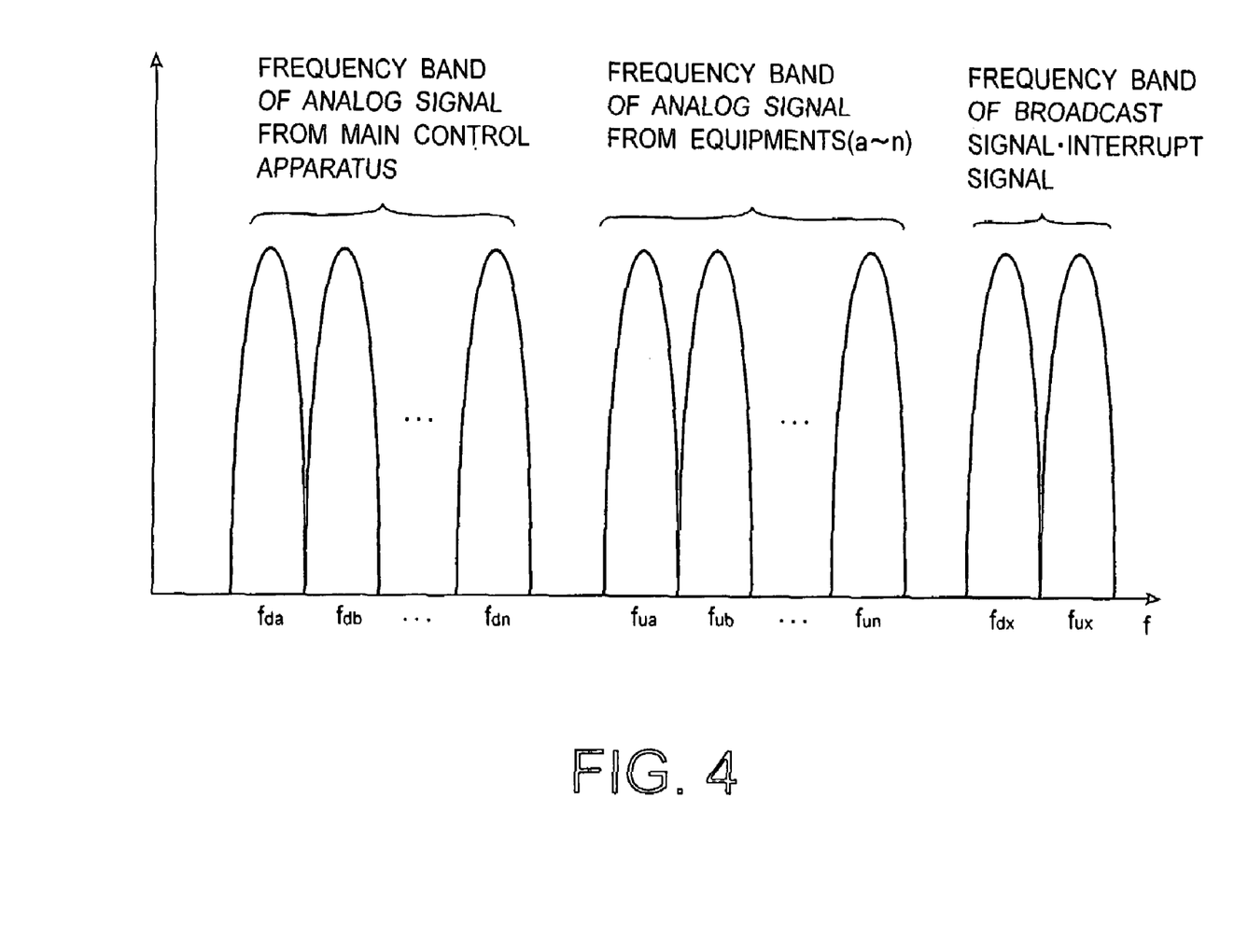
FIG. 4 is a schematic diagram showing assignment of frequency band according to the present embodiment.

FIG. 4 is a schematic diagram showing assignment of the frequency band according to the present embodiment. As shown in FIG. 4, a predetermined frequency band ($f_{da}$~$f_{dn}$) is assigned to the analog signals (A~N) to output from the main control apparatus 1 to the equipments 2a~2n, and a predetermined frequency band ($f_{ua}$~$f_{un}$) is assigned to the analog signals (a~n) to output from the equipments 2a~2n to the main control apparatus 1. Furthermore, a predetermined frequency ($f_{dx}$) is assigned to the broadcast signal (X) to output from the main control apparatus 1 to the equipments 2a~2n, and a predetermined frequency ($f_{ux}$) is assigned to the interrupt signal (x) to output from the equipments 2a~2n to the main control apparatus 1.

Figure 5A:
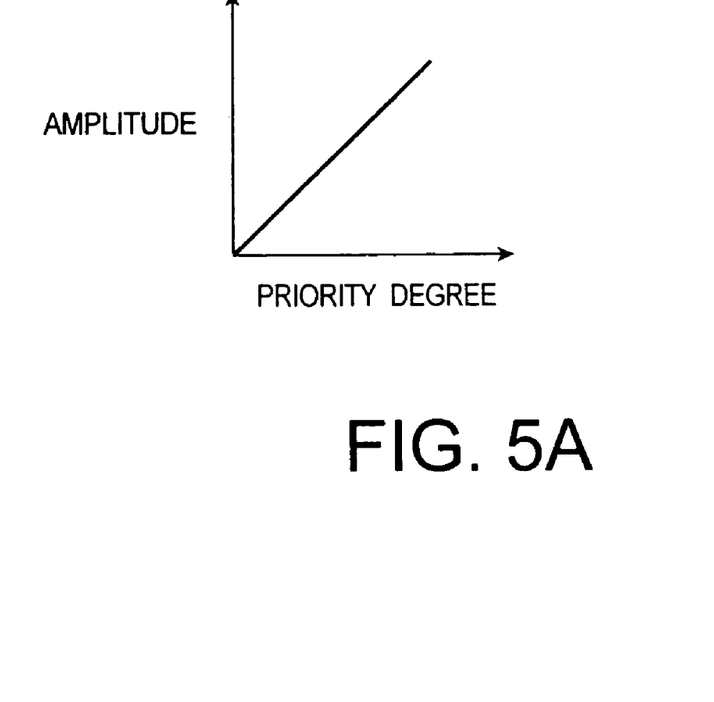
FIGS. 5A and 5B are schematic diagrams showing one method to set a priority degree of an interrupt signal according to the present embodiment.
Figure 5B:
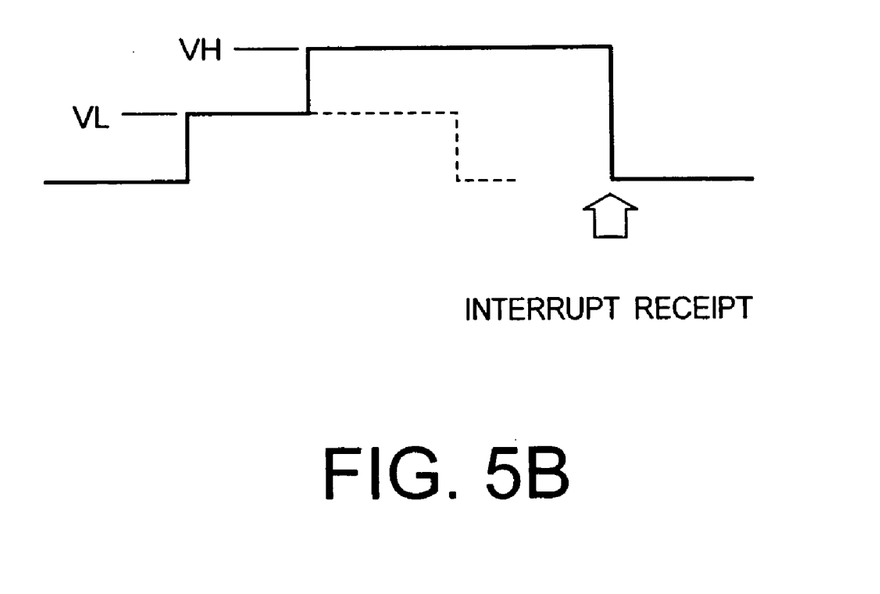

FIGS. 5A and 5B are schematic diagrams of one example of a method for setting a priority degree of the interrupt signal. As shown in FIG. 5A, a priority degree of the interrupt signal from the equipments 2a~2n to the main control apparatus 1 increases in proportion to a value of an amplitude.

Concretely, as shown in FIG. 5B, in the case that the amplitude of the interrupt signal from the equipment 2a to the main control apparatus 1 is "VL" and the amplitude of the interrupt signal from the equipment 2b to the main control apparatus 1 is "VH", at a timing of interrupt receipt, the interrupt signal having a larger amplitude from the equipment 2b is preferred.

Figure 6A:
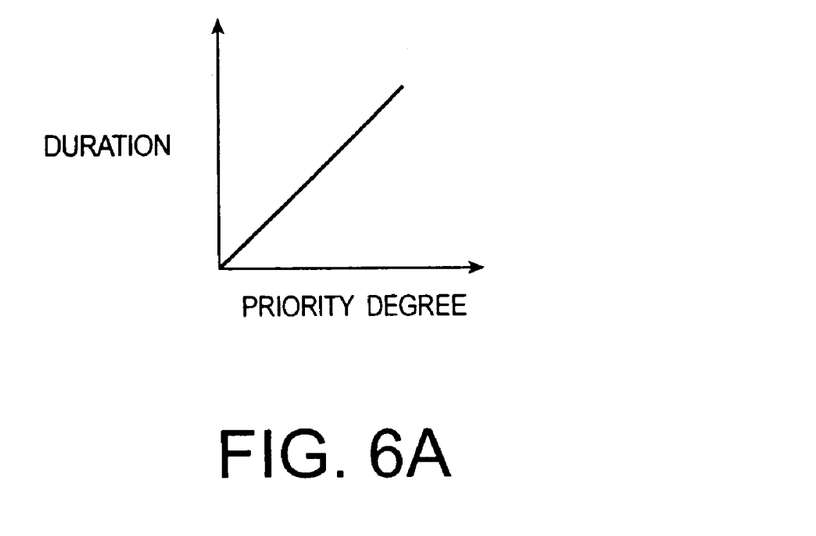
FIGS. 6A and 6B are schematic diagrams showing another method to set a priority degree of an interrupt signal.
Figure 6B:
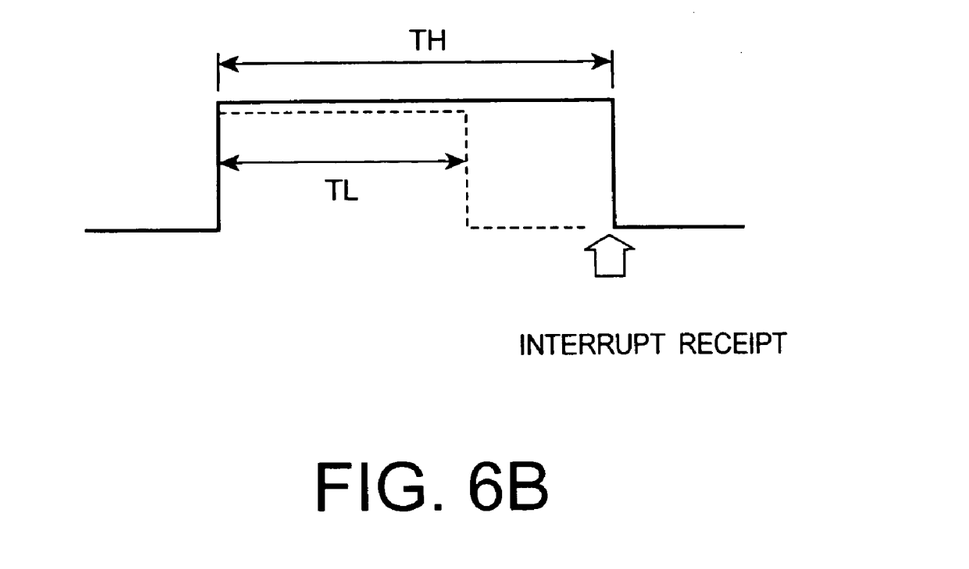

FIGS. 6A and 6B are schematic diagrams of another example of a method for setting a priority degree of the interrupt signal. As shown in FIG. 6A, a priority degree of the interrupt signal from the equipments 2a~2n to the main control apparatus 1 increases in proportion to a length of a duration of the interrupt signal.

Concretely, as shown in FIG. 6B, in the case that the duration of the interrupt signal from the equipment 2a to the main control apparatus 1 is "TL" and the duration of the interrupt signal from the equipment 2b to the main control apparatus 1 is "TH", at a timing of interrupt receipt, the interrupt signal having a longer duration from the equipment 2b is preferred.

Figure 7:
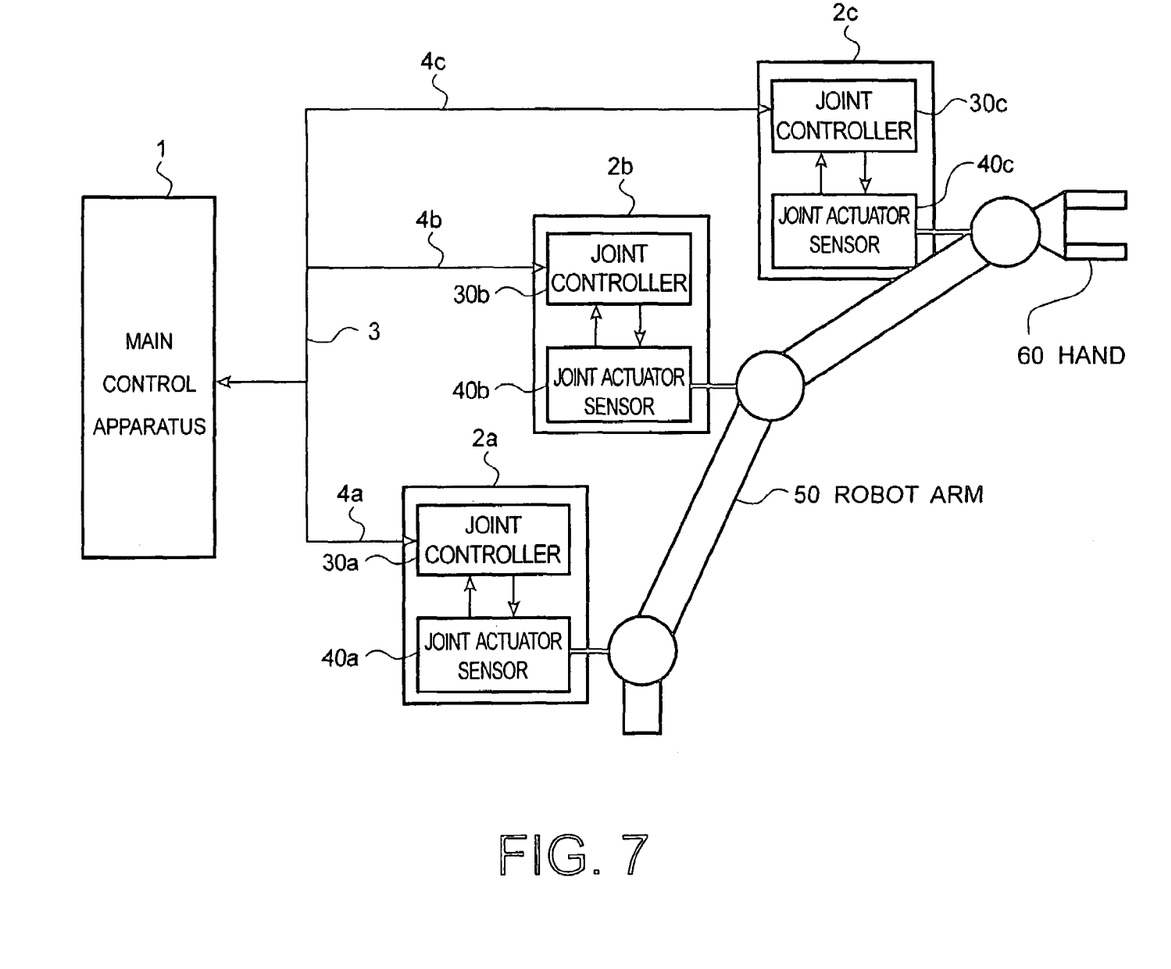
FIG. 7 is a schematic diagram of one concrete example of the control system.

FIG. 7 is a concrete example of a control system. As shown in FIG. 7, the control system of the present invention is, for example, applied to a robot arm. In this case, the main control apparatus 1 controls a position or speed of a robot arm 50 and a hand 60 set to the point of the robot arm 50, and a strength of power to actuate the robot arm 50 and the hand 60 with the passage of time. Concretely, as for the equipments 2a~2c actuating each joint of the robot arm 50, the main control apparatus 1 sends an analog signal through the single signal line 3 using a frequency band ($f_{da}$~$f_{dc}$) assigned to each equipment 2a~2c. Furthermore, the equipments 2a~2c respectively receive the analog signal sent using the frequency band ($f_{da}$~$f_{dc}$) through the multipoint line 4a~4c diverged from the single signal line 3.

The equipments 2a~2c have the same component. Accordingly, hereinafter, the equipment 2a is only explained as an example.

Figure 8:
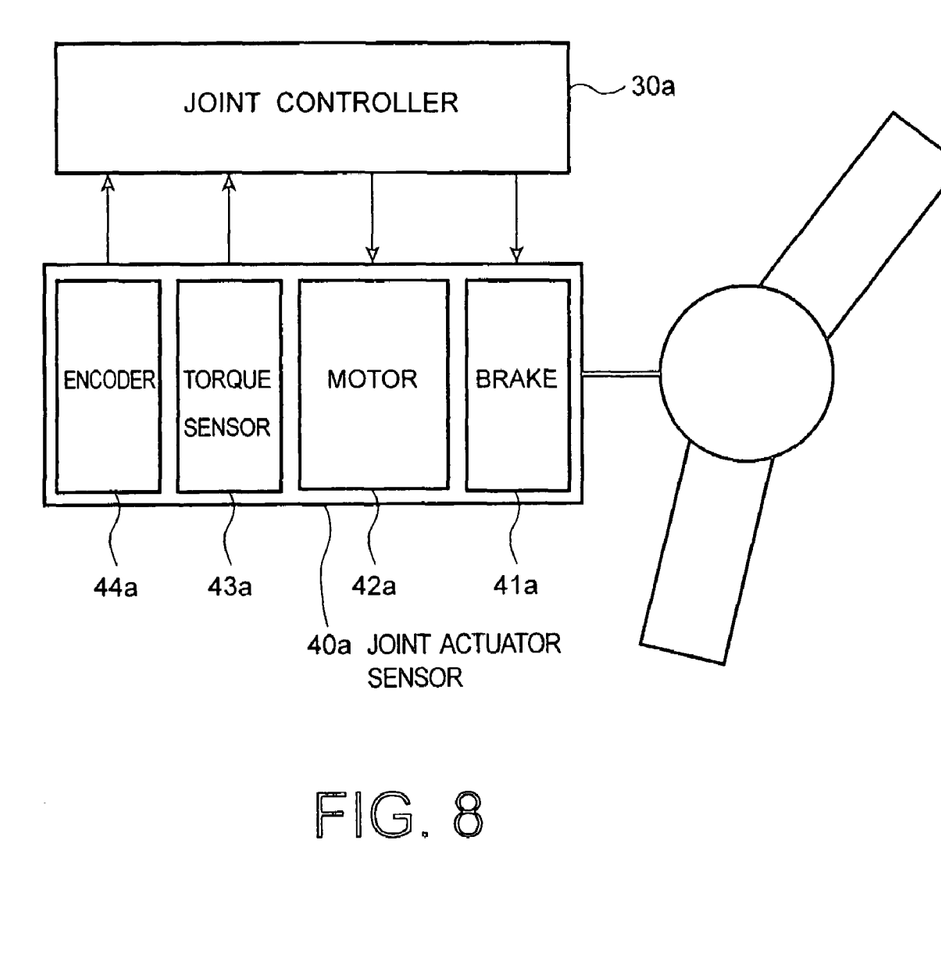
FIG. 8 is a schematic diagram of another example of the control system.

FIG. 8 is a block diagram of the equipment 2a. As shown in FIG. 8, the equipment 2a includes a joint controller 30a and a joint actuator • sensor 40a.

The joint controller 30a controls a position and a speed of the joint by controlling the joint actuator • sensor 40a. Concretely, the joint controller 30a includes the interface circuit 20a, and controls the joint actuator • sensor 40a based on the analog signal sent using the frequency ($f_{da}$) assigned to the equipment 2a.

The joint actuator • sensor 40a includes a brake 41a to stop a movement of the joint, a motor 42a to activate the joint, a torque sensor 43a to measure a torque of the joint, and an encoder 44a to measure an angle and a position of the joint.

Hereinafter, case that the main control apparatus 1 sends the broadcast signal to the equipments 2a~2c is explained.

The main control apparatus 1 controls the equipments 2a~2c based on a predetermined time axis (with the passage of time). Accordingly, if time axes of each equipment 2a~2c do not coincide, a problem (for example, a timing of each equipment to grasp a working object shifts) occurs. Accordingly, as for each equipment 2a~2c, the main control apparatus 1 sends a broadcast signal as a trigger to coincide time axes of each equipment 2a~2c using a common frequency ($f_{dx}$) assigned to each equipment 2a~2c.

A power added to the hand 60 is determined by calculating a measurement value of torque sensors 43a~43c of each joint of the robot arm 50. However, the torque is power information which changes with the passage of time. In order to exactly calculate the power of the hand 60, values of the torque sensor of each joint are necessary to be measured at the same time. Accordingly, the main control apparatus 1 sends the broadcast signal of torque measurement to each joint controller 30a~30c at the same time.

Furthermore, in the case that movement of the robot arm 50 or the hand 60 should be immediately stopped (For example, unusual timing or urgent timing), as for the equipments 2a~2c, the main control apparatus 1 sends a broadcast signal to stop movement of each joint using a frequency ($f_{dx}$) assigned to each equipment 2a~2c.

Furthermore, in control of the robot (mechatoronics equipment), in order for the main control apparatus 1 to select a control mode suitable for working of the robot, the control mode of each equipment 2a~2c is often changed at the same time (For example, a position control mode is changed to a power control mode.). In this case, the main control apparatus 1 sends a broadcast signal to reset each setting or preset each parameter of the equipments 2a~2c using a common frequency ($f_{dx}$) assigned to each equipment 2a~2c.

As mentioned-above, in control of the system for which a hard real time performance of the robot (mechatoronics equipment) is required, as for a plurality of equipments (each equipment 2a~2c), the main control apparatus 1 needs to send an analog signal to indicate a predetermined working. Furthermore, in the plurality of equipments, a preset of an encoder or an offset processing of the analog signal needs to be synchronized. Accordingly, as for the plurality of equipments, the main control apparatus 1 sends a broadcast signal using a common frequency band assigned to each equipment.

(Operation of the Control System)

Figure 9:
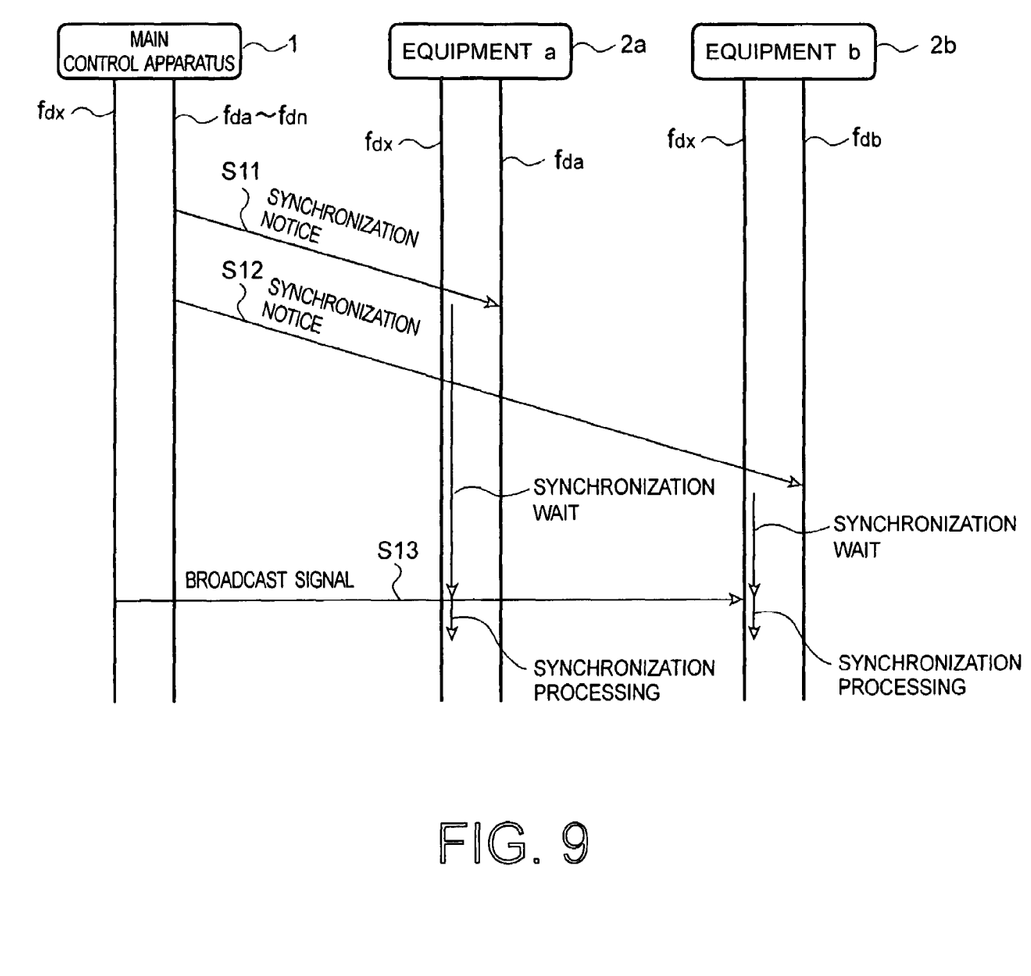
FIG. 9 is a schematic diagram of operation sequence of the main control apparatus to send a broadcast signal to two equipments.

Hereinafter, operation of the control system of the present invention is explained. FIG. 9 is a sequence chart of operation of the main control apparatus 1 to send a broadcast signal to the equipments 2a and 2b according to the present embodiment.

As shown in FIG. 9, at S11, the main control apparatus 1 sends a synchronization notice (analog signal (A)) to the equipment 2a using a frequency ($f_{da}$) assigned to the equipment 2a. In this case, the equipment 2a waits for synchronization until a broadcast signal is received from the main control apparatus 1.

At S12, the main control apparatus 1 sends a synchronization notice (analog signal (B)) to the equipment 2b using a frequency ($f_{db}$) assigned to the equipment 2b. In this case, the equipment 2b waits for synchronization until a broadcast signal is received from the main control apparatus 1.

At S13, the main control apparatus 1 sends the broadcast signal (X) to the equipments 2a and 2b by using a common frequency ($f_{dx}$) assigned to the equipments 2a and 2b.

Figure 10:
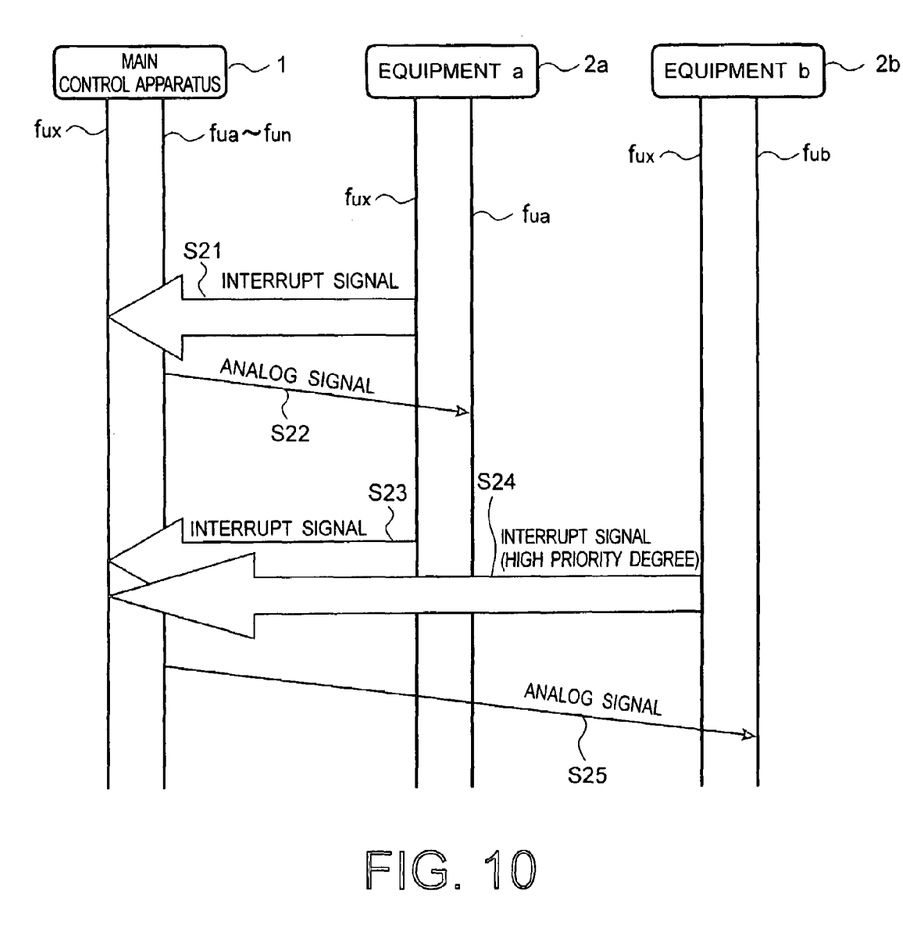
FIG. 10 is a schematic diagram of operation sequence of two equipments to send an interrupt signal to the main control apparatus.

FIG. 10 is a sequence chart of operation of the equipments 2a and 2b to send an interrupt signal to the main control apparatus 1 according to the present embodiment.

As shown in FIG. 10, at S21, the equipment 2a sends an interrupt signal (x) to the main control apparatus 1 using a common frequency ($f_{ux}$) assigned to the equipments 2a and 2b.

At S22, the main control apparatus 1 sends an interrupt service (analog signal (A)) to the equipment 2a using a frequency ($f_{da}$) assigned to the equipment 2a because the main control apparatus 1 does not receive another interrupt signal at this timing.

Furthermore, at S23, the equipment 2a sends an interrupt signal (x) to the main control apparatus 1 using a common frequency ($f_{ux}$) assigned to the equipments 2a and 2b.

At S24, the equipment 2b sends an interrupt signal (x) to the main control apparatus 1 using a common frequency ($f_{ux}$) assigned to the equipments 2a and 2b. As shown in FIG. 10, this interrupt signal has a priority degree higher than the interrupt signal sent by the equipment 2a at S23.

At S25, the main control apparatus 1 sends an interrupt service signal (analog signal (B)) to the equipment 2b using a frequency ($f_{db}$) assigned to the equipment 2b because the interrupt signal sent by the equipment 2b has a priority degree higher than the interrupt signal sent by the equipment 2a.

(Operation and Effect of the Control System)

In the control system of the present invention, the main control apparatus 1 respectively sends an analog signal (A~N) to each equipment 2a~2n through a single signal line 3 using a frequency band ($f_{da}$~$f_{dn}$) assigned to the equipment 2a~2n. Accordingly, in comparison with the case that the main control apparatus 1 and each equipment 2a~2n are respectively connected by each leased line, a number of signal lines to connect between the main control apparatus 1 and each equipment 2a~2n can be decreased.

Furthermore, the main control apparatus 1 simultaneously sends the analog signal to each equipment 2a~2n. Accordingly, the control system can maintain immediacy (hard real time performance) Furthermore, in the control system of the present invention, the main control apparatus 1 respectively sends a broadcast signal (X) to each equipment 2a~2n through a single signal line 3 by using a common frequency ($f_{dx}$) assigned to each equipment 2a~2n. Accordingly, the main control apparatus 1 can execute synchronization (For example, synchronization of internal timer of each equipment) among each equipment 2a~2n, and execute simultaneous change of control mode of each equipment 2a~2n (For example, a position control mode is changed to a power control mode).

Furthermore, in the control system of the present invention, the main control apparatus 1 respectively receives an analog signal (a~n) sent by each equipment 2a~2n through the single signal line 3. Accordingly, in comparison with the case that the main control apparatus 1 and each equipment 2a~2n are respectively connected by each leased line, the number of signal lines needed to connect between the main control apparatus 1 and each equipment 2a~2n can be decreased.

Furthermore, in the control system of the present invention, the main control apparatus 1 receives an interrupt signal (x) sent using a common frequency ($f_{ux}$) assigned to each equipment 2a~2n through the single signal line 3. Accordingly, the equipments 2a~2n can send a high emergent signal (For example, a danger notice signal) as the interrupt signal (x) to the main control signal 1.

(Modification)

In the above-mentioned embodiment, the main control apparatus 1 respectively sends an analog signal (A~N) to each equipment 2a~2n through a single signal line 3 by using a frequency band ($f_{da}$~$f_{dn}$) assigned to the equipment 2a~2n. However, in this modification, the main control apparatus 1 sends a digital signal (D) including an address of the equipments 2a~2n through the single signal line 3. The digital signal (D) is comprised of a plurality of bits (1~n). A frequency band ($f_{d1}$~$f_{dn}$) is respectively assigned to each bit (1~n). When the main control apparatus 1 sends the digital signal (D), each bit of the digital signal (D) is respectively modulated by the assigned frequency band ($f_{d1}$~$f_{dn}$), and sent through the single signal line 3.

Furthermore, in this modification, when the equipments respectively receive a modulated digital signal through the single signal line 3, each bit of the modulated digital signal is respectively demodulated using the assigned frequency band ($f_{d1}$~$f_{dn}$). After the digital signal (D) is demodulated, each equipment 2a~2n decides whether an address included in the digital signal (D) is its self-address. If the address directs to the self-address, the equipment 2a~2n extracts data included in the digital signal (D). In this modification, the digital signal (D) includes addresses of the equipments 2a~2n, a bus control signal, output data and so on. Operation of this modification is further explained as follows.

Figure 11:
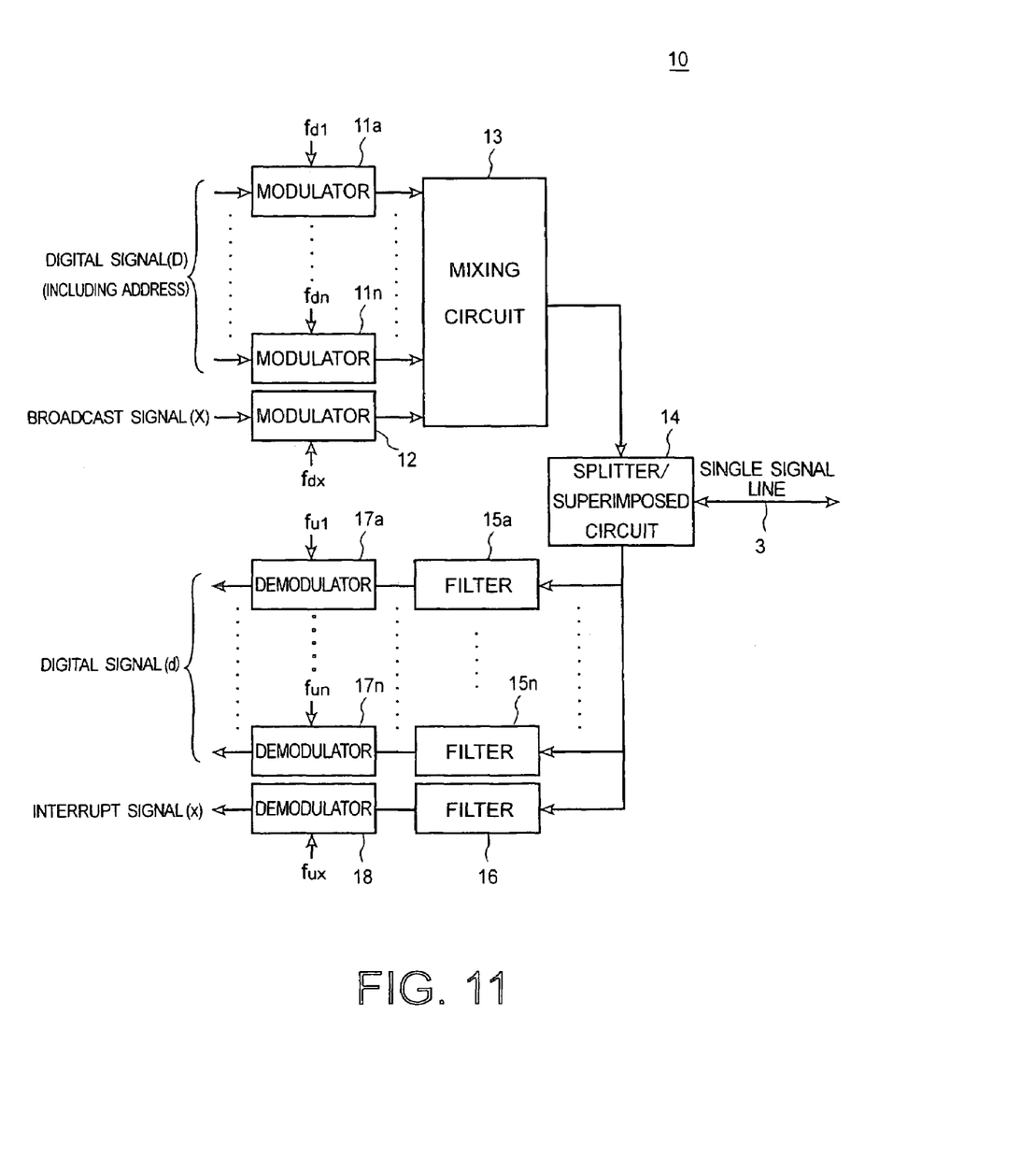
FIG. 11 is a block diagram of the interface circuit 10 in the control system of FIG. 1 according to a modification of the present embodiment.

FIG. 11 is a block diagram of the interface circuit 10 (FIG. 1) in the main control apparatus 1 according to the modification.

In FIG. 11, modulators 11a~11n respectively modulate the digital signal (D) to output from the main control apparatus 1 to the equipment 2a~2n. As mentioned-above, the digital signal (D) is comprised of a plurality of bits (1~n). A frequency band ($f_{d1}$~$f_{dn}$) is respectively assigned to each bit of the digital signal (D). In other words, a frequency band ($f_{d1}$~$f_{dn}$) is respectively assigned to each modulator 11a~11n. Accordingly, the modulator 11a modulates a first bit of the digital signal (D) by using the frequency ($f_{d1}$), and the modulator 11n modulates n-th bit of the digital signal (D) by using the frequency ($f_{dn}$).

A modulator 12 modulates a broadcast signal (X) to output from the main control apparatus 1 to the equipments 2a~2n by using a frequency ($f_{dx}$).

A mixing circuit 13 mixes the digital signal (D) modulated by the modulators 11a~11n with the broadcast signal (X) modulated by the modulator 12.

A splitter/superimposed circuit 14 superimposes the digital signal (D) and the broadcast signal (X) mixed by the mixing circuit 13 on predetermined frequency band ($f_{d1}$~$f_{dn}$, $f_{dx}$). Furthermore, the splitter/superimposed circuit 14 separates a digital signal (d) and an interrupt signal (x) each superimposed on predetermined frequency band ($f_{u1}$~$f_{un}$, $f_{ux}$).

Filters 15a~15n respectively passes one bit of a digital signal (d) sent using a predetermined frequency assigned to each bit. In this case, the digital signal (d) is comprised of a plurality of bits (1~n). Concretely, the each filter 15a~15n extracts one bit sent using the frequency band ($f_{u1}$~$f_{un}$) assigned to the bits from the digital signal (d) separated by the splitter/superimposed circuit 14.

A filter 16 passes a signal sent using a predetermined frequency only. Concretely, the filter 16 extracts an interrupt signal (x) sent using a predetermined frequency ($f_{ux}$) from the interrupt signal (x) separated by the splitter/superimposed circuit 14. If the splitter/superimposed circuit 14 can separate the interrupt signal (x) only, the filter 16 may be omitted.

Demodulators 17a~17n respectively demodulates each bit of the digital signal (d) passed through each filter 15a~15n. As mentioned-above, the digital signal (d) is comprised of a plurality of bits (1~n). A frequency band ($f_{u1}$~$f_{un}$) is respectively divided among the bits of the digital signal (d). In other words, one frequency from the frequency band ($f_{u1}$~$f_{un}$) is respectively assigned to each demodulator 17a~17n. Accordingly, the demodulator 17a demodulates a first bit of the digital signal (d) using the frequency ($f_{u1}$), and the demodulator 17n demodulates n-th bit of the digital signal (d) using the frequency ($f_{un}$).

A demodulator 18 demodulates the interrupt signal (x) passed through the filter 16 using a frequency ($f_{ux}$).

Figure 12:
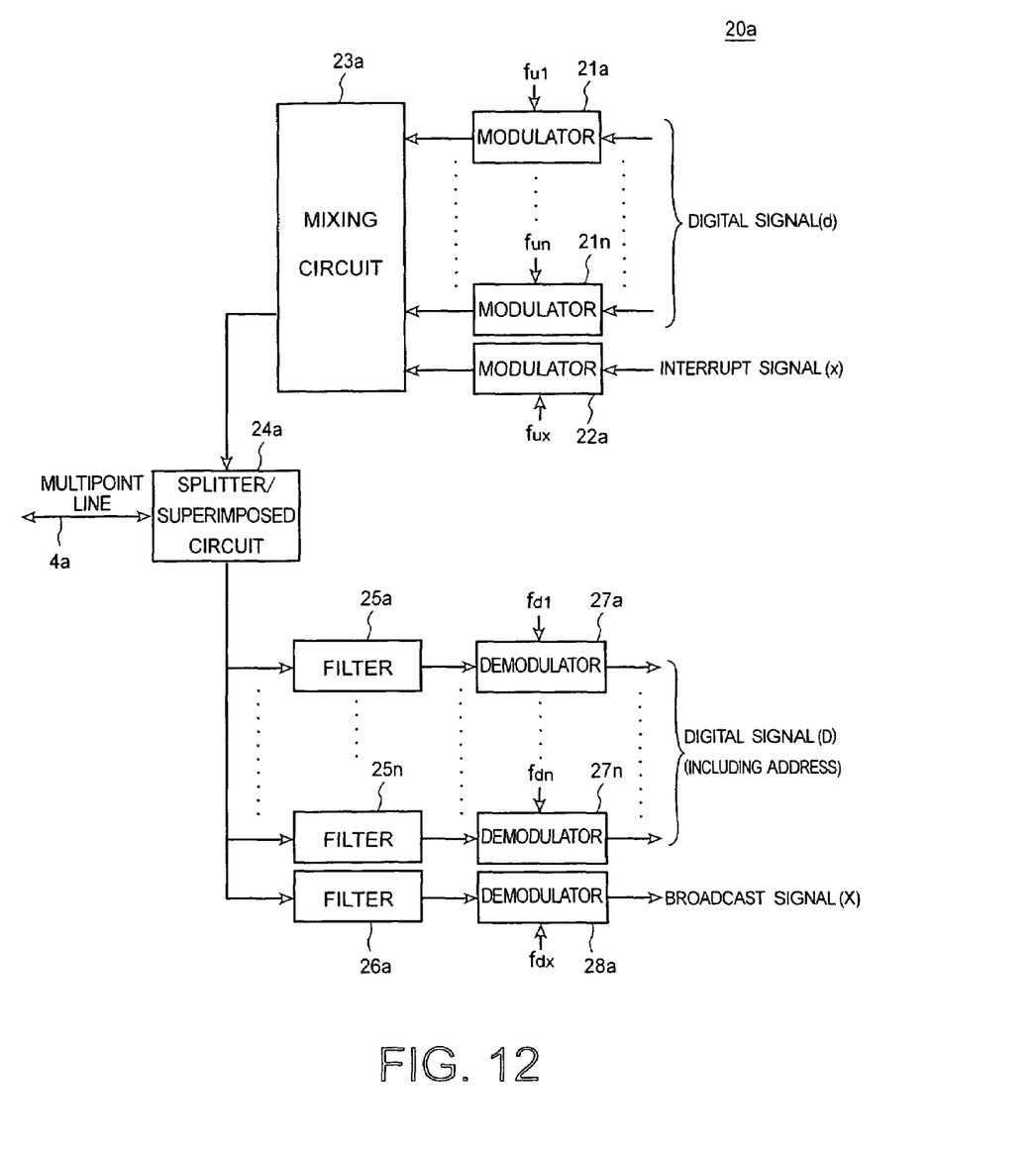
FIG. 12 is a block diagram of the interface circuit 20a in the control system of FIG. 1 according to the modification of the present embodiment.

FIG. 12 is a block diagram of the interface circuit 20 (FIG. 1) in the equipment 2a according to the modification.

In FIG. 12, modulators 21a~21n respectively modulate the digital signal (d) to output from the equipment 2a to the main control apparatus 1. As mentioned-above, the digital signal (d) is comprised of a plurality of bits (1~n). A frequency band ($f_{u1}$~$f_{un}$) is respectively assigned to each bit of the digital signal (d). In other words, a frequency band ($f_{u1}$~$f_{un}$) is respectively assigned to each modulator 21a~21n. Accordingly, the modulator 21a modulates a first bit of the digital signal (d) using the frequency ($f_{u1}$), and the modulator 21n modulates n-th bit of the digital signal (d) using the frequency ($f_{un}$).

A modulator 22a modulates an interrupt signal (x) to output from the equipment 2a to the main control apparatus 1 using a frequency ($f_{ux}$).

A mixing circuit 23a mixes the digital signal (d) modulated by the modulators 21a with the interrupt signal (x) modulated by the modulator 22a.

A splitter/superimposed circuit 24a superimposes the digital signal (d) and the interrupt signal (x) mixed by the mixing circuit 23a on predetermined frequency band ($f_{u1}$~$f_{un}$, $f_{ux}$). Furthermore, the splitter/superimposed circuit 24a separates a digital signal (D) and an interrupt signal (X) each superimposed on predetermined frequency band ($f_{d1}$~$f_{dn}$, $f_{dx}$).

Filters 25a~25n respectively passes one bit of a digital signal (D) sent using a predetermined frequency assigned to each bit. In this case, the digital signal (D) is comprised of a plurality of bits (1~n). Concretely, each filter 25a~25n extracts one bit sent using the frequency band ($f_{d1}$~$f_{dn}$) assigned to each bit from the digital signal (D) separated by the splitter/superimposed circuit 24a.

A filter 26a passes a signal sent using a predetermined frequency only. Concretely, the filter 26a extracts a broadcast signal (X) sent using a predetermined frequency ($f_{dx}$) from the broadcast signal (X) separated by the splitter/superimposed circuit 24a. If the splitter/superimposed circuit 24a can separate the broadcast signal (X) only, the filter 26a may be omitted.

Demodulators 27a~27n respectively demodulates each bit of the digital signal (D) passed through each filter 25a~25n. As mentioned-above, the digital signal (D) is comprised of a plurality of bits (1~n) A frequency band ($f_{d1}$~$f_{dn}$) is respectively assigned to each bit of the digital signal (D). In other words, a frequency band ($f_{d1}$~$f_{dn}$) is respectively assigned to each demodulator 27a~27n. Accordingly, the demodulator 27a demodulates a first bit of the digital signal (D) using the frequency ($f_{d1}$), and the demodulator 27n demodulates n-th bit of the digital signal (D) using the frequency ($f_{dn}$) After each bit of the digital signal (D) is demodulated, the equipment 2a decides whether an address included in the digital signal (D) is its self-address of the equipment 2a. If the address is its self-address, the equipment 2a extracts data included in the digital signal (D).

A demodulator 28a demodulates the broadcast signal (X) passed through the filter 26a using a frequency ($f_{dx}$).

Figure 13:
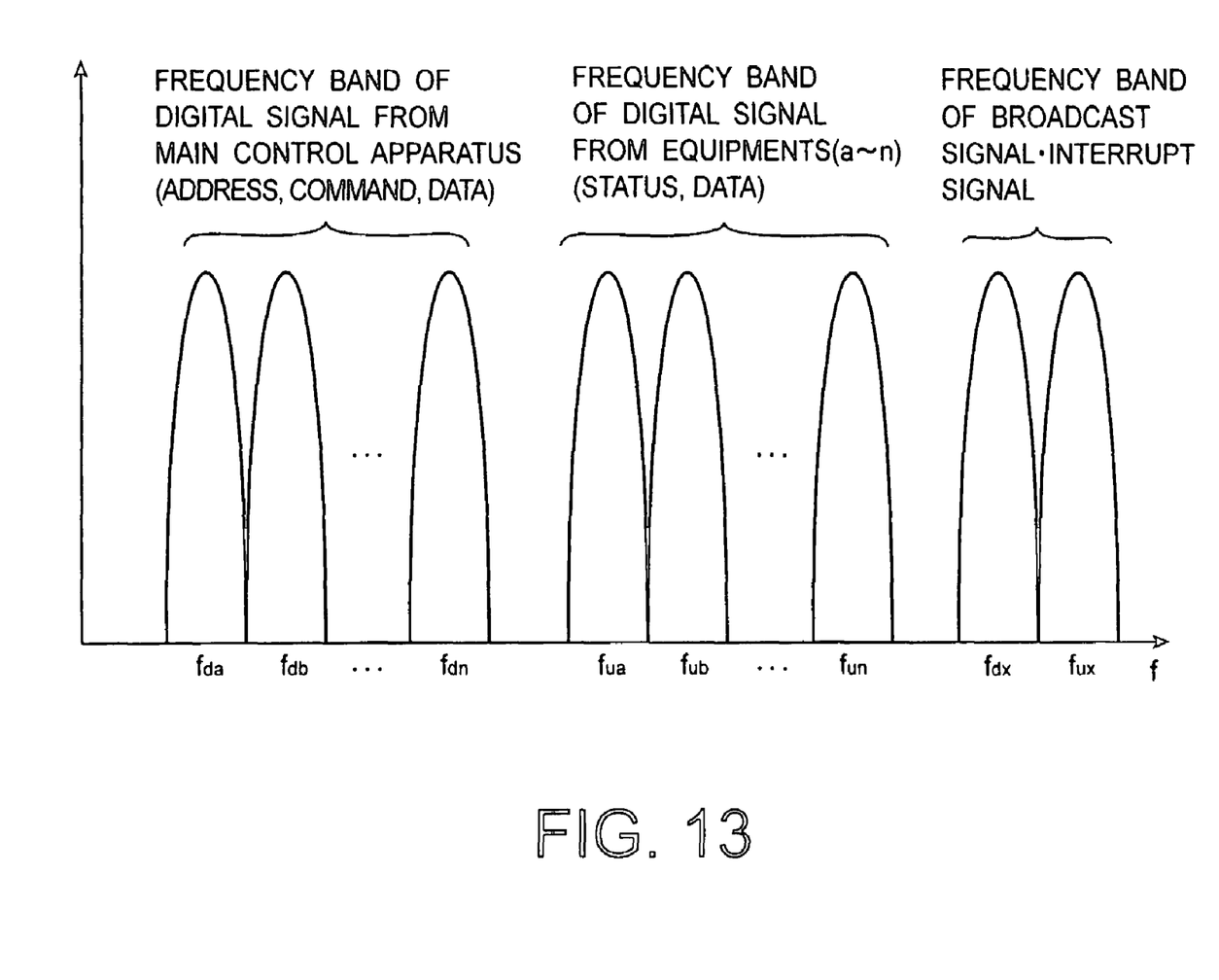
FIG. 13 is a schematic diagram showing assignment of frequency band according to the modification of the present embodiment.

FIG. 13 is a schematic diagram showing assignment of the frequency band according to the modification. As shown in FIG. 13, a predetermined frequency band ($f_{d1}$~$f_{dn}$) are respectively assigned to each bit of the digital signal (D) to output from the main control apparatus 1 to the equipments 2a~2n, and a predetermined frequency band ($f_{u1}$~$f_{un}$) are respectively assigned to each bit of the digital signal (d) to output from the equipments 2a~2n to the main control apparatus 1. Furthermore, a predetermined frequency ($f_{dx}$) is assigned to the broadcast signal (X) to output from the main control apparatus 1 to the equipments 2a~2n, and a predetermined frequency ($f_{ux}$) is assigned to the interrupt signal (x) to output from the equipments 2a~2n to the main control apparatus 1.

As mentioned-above, in the control system of the present invention, a hard real time performance can be maintained, and the number of signal lines needed to connect between the main control apparatus and each equipment can be decreased.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A control system, comprising:
   a main control apparatus configured to connect to a single signal line; and
   a plurality of equipments respectively configured to connect to a multipoint line, each multipoint line being diverged from the single signal line; wherein
   the main control apparatus sends a control signal to the single signal line using a frequency uniquely assigned to each equipment,
   each equipment receives the control signal from the multipoint line using the frequency uniquely assigned to each equipment,
   the main control apparatus sends a synchronization notice to the single signal line using the frequency uniquely assigned to each equipment,
   each equipment waits for synchronization until a broadcast signal is received from the multipoint line after the synchronization notice is received,
   the main control apparatus sends the broadcast signal as a trigger to coincide time axes of each equipment to the single signal line using a frequency commonly assigned to each equipment, and
   each equipment receives the broadcast signal from the multipoint line using the frequency commonly assigned to each equipment.

2. The control system according to claim 1, wherein said main control apparatus includes a plurality of modulators each configured to differently modulate the control signal using the frequency assigned to each equipment, and a modulator configured to commonly modulate the broadcast signal using the frequency commonly assigned to each equipment.

3. The control system according to claim 2, wherein each equipment includes a filter configured to pass the control signal modulated using the frequency assigned to each equipment, and a demodulator configured to demodulate the control signal passed through the filter using the frequency assigned to each equipment.

4. The control system according to claim 3, wherein said each equipment includes a filter configured to pass the control signal modulated using the frequency commonly assigned to each equipment, and a demodulator configured to demodulate the control signal passed through the filter using the frequency commonly assigned to each equipment.

5. A control system, comprising:
   a main control apparatus configured to connect to a single signal line; and
   a plurality of equipments respectively configured to connect to a multipoint line, each multipoint line being diverged from the single signal line; wherein
   each equipment sends a control signal to the multipoint line using a frequency uniquely assigned to each equipment,
   the main control apparatus receives the control signal from the single signal line using the frequency uniquely assigned to each equipment, each equipment sends an interrupt signal having a priority degree as a danger notice signal to the multipoint line using a frequency commonly assigned to each equipment, the main control apparatus receives the interrupt signal from the single signal line using the frequency commonly assigned to each equipment, and sends an interruption service signal to one equipment which sent the interrupt signal having the highest priority degree when a plurality of interrupt signals of the plurality of equipments are received.

6. The control system according to claim 5, wherein said each equipment includes a modulator configured to modulate the control signal using the frequency assigned to each equipment, and a modulator configured to modulate the interrupt signal using the frequency commonly assigned to each equipment.

7. The control system according to claim 6, wherein said main control apparatus includes a plurality of filters each configured to differently pass the control signal modulated using the frequency assigned to each equipment, and a plurality of demodulators each configured to differently demodulate the control signal passed through each filter using the frequency assigned to each equipment.

8. The control system according to claim 7, wherein said main control apparatus includes a filter configured to pass the interrupt signal modulated using the frequency commonly assigned to each equipment, and a demodulator configured to demodulate the interrupt signal passed through the filter using the frequency commonly assigned to each equipment.

9. The control system according to claim 5, wherein the interrupt signal of each equipment has the priority degree in proportion to an amplitude of the interrupt signal.

10. The control system according to claim 5, wherein the interrupt signal of each equipment has the priority degree in proportion to a duration of the interrupt signal.

11. A control system, comprising:
a main control apparatus configured to connect to a single signal line; and
a plurality of equipments respectively configured to connect to a multipoint line, each multipoint line being diverged from the single signal line; wherein
the main control apparatus sends a digital signal including an address of at least one equipment to the single signal line using a frequency uniquely assigned to each equipment,
each equipment receives the digital signal including the address of the equipment from the multipoint line using the frequency uniquely assigned to each equipment,
the main control apparatus sends a synchronization notice to the single signal line using the frequency uniquely assigned to each equipment,
each equipment waits for synchronization until a broadcast signal is received from the multipoint line after the synchronization notice is received, the main control apparatus sends the broadcast signal as a trigger to coincide time axes of each equipment to the single signal line using a frequency commonly assigned to each equipment, and each equipment receives the broadcast signal from the multipoint line using the frequency commonly assigned to each equipment.

12. The control system according to claim 11, wherein said main control apparatus includes a plurality of modulators each configured to differently modulate each bit of the digital signal using the frequency assigned to each bit.

13. The control system according to claim 12, wherein each equipment includes a plurality of filters each configured to differently pass each bit of the digital signal.

14. The control system according to claim 13, wherein each equipment includes a plurality of demodulators each configured to differently demodulate each bit of the digital signal using the frequency assigned to each bit.

15. A control system, comprising:
a main control apparatus configured to connect to a single signal line; and
a plurality of equipments respectively configured to connect to a multipoint line, each multipoint line being diverged from the single signal line, wherein
each equipment sends a digital signal including an address of the equipment to the multipoint line using a frequency uniquely assigned to each equipment, the main control apparatus receives the digital signal from the single signal line using the frequency uniquely assigned to each equipment,
each equipment sends an interrupt signal having a priority degree as a danger notice signal to the multipoint line using a frequency commonly assigned to each equipment,
the main control apparatus receives the interrupt signal from the single signal line using the frequency commonly assigned to each equipment, and sends an interruption service signal to one equipment which sent the interrupt signal having the highest priority degree when a plurality of interrupt signals of the plurality of equipments are received.

16. The control system according to claim 15, wherein each equipment includes a plurality of modulators each configured to differently modulate each bit of the digital signal using the frequency assigned to each bit.

17. The control system according to claim 16, wherein said main control apparatus includes a plurality of filters each configured to differently pass each bit of the digital signal.

18. The control system according to claim 17, wherein said main control apparatus includes a plurality of demodulators each configured to differently demodulate each bit of the digital signal using the frequency assigned to each bit.

* * * * *